US009015142B2

(12) United States Patent
Fu (10) Patent No.: US 9,015,142 B2
(45) Date of Patent: Apr. 21, 2015

(54) IDENTIFYING LISTINGS OF MULTI-SITE ENTITIES BASED ON USER BEHAVIOR SIGNALS

(75) Inventor: Xin Fu, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 312 days.

(21) Appl. No.: 13/157,810

(22) Filed: Jun. 10, 2011

(65) Prior Publication Data

US 2015/0058328 A1    Feb. 26, 2015

(51) Int. Cl.
*G06F 17/30* (2006.01)
(52) U.S. Cl.
CPC .................................. *G06F 17/3094* (2013.01)
(58) Field of Classification Search
None
See application file for complete search history.

(56) References Cited

U.S. PATENT DOCUMENTS

| | | | |
|---|---|---|---|
| 8,255,386 B1 * | 8/2012 | Annau et al. | 707/711 |
| 8,312,010 B1 * | 11/2012 | Chen et al. | 707/723 |
| 8,370,337 B2 | 2/2013 | Kanungo et al. | |
| 2006/0129555 A1 * | 6/2006 | Burdick et al. | 707/7 |
| 2006/0149734 A1 * | 7/2006 | Egnor et al. | 707/7 |
| 2006/0206460 A1 | 9/2006 | Gadkari | |
| 2008/0059462 A1 * | 3/2008 | Millett et al. | 707/6 |
| 2008/0091412 A1 * | 4/2008 | Strope et al. | 704/10 |
| 2010/0125570 A1 | 5/2010 | Chapelle et al. | |
| 2011/0029517 A1 | 2/2011 | Ji et al. | |
| 2011/0143733 A1 * | 6/2011 | Ramer et al. | 455/414.1 |
| 2012/0158705 A1 * | 6/2012 | Konig et al. | 707/723 |

* cited by examiner

*Primary Examiner* — Kevin L Young
(74) *Attorney, Agent, or Firm* — Marshall, Gerstein & Borun LLP (57) ABSTRACT

Methods, systems, and apparatus, including computer programs encoded on a computer storage medium, for identifying listings of multi-site entities based on user behavior signals. In one aspect, a method exploits user behavioral signals that are strong indicators of whether a search result previously presented for a multi-site-entity search query is, in fact, a relevant result, and affords sufficient weight to these behavioral signals to overcome other signals of relevance for the search result. Two such strong user behavior signals include (i) users invoking an information window from a search result and (ii) users submitting a direction request related to a search result. A black list of search results and/or a search result index can be generated based on how the two strong behavior signals associated with the search results compare to threshold values set for the two strong behavior signals.

22 Claims, 3 Drawing Sheets

IDENTIFYING LISTINGS OF MULTI-SITE ENTITIES BASED ON USER BEHAVIOR SIGNALS

BACKGROUND

This specification relates generally to search systems.

Many search systems allow users to enter search queries for businesses and places of interest through a search interface. In response to a received search query, the search systems identify business entities or places of interest that are relevant to the search criteria specified in the search query, and present search results referring to these relevant business entities or places of interest with their associated physical addresses. Some search systems also present the search results in a ranked order. Each search result may be presented on a user's device in one or more of a variety of forms, e.g., a textual form, an image, or a visual marker on a map.

A user of a location search service sometimes wishes to find a business or a government unit that, for the user's purpose, has functionally equivalent sites at multiple distinct geographic locations. For example, member stores of a business chain or business franchise typically offer roughly equivalent goods and/or services, and can be functional equivalents of one another for serving the user's particular purchase or service needs. Entities having multiple functionally equivalent sites are referred to herein as multi-site entities. The user can submit a search query that includes a search keyword specifying a shared name of a group of related functionally equivalent entities (i.e., a multi-site entity name), intending to locate one or more of the entities situated close to a target location. However, search results obtained based on the name specified by the search keyword sometimes refer to entities that are not true members of the group of related entities.

SUMMARY

This specification describes technologies relating to identifying business listings of multi-site entities based on user behavior signals.

The methods and systems described in this specification exploit user behavioral signals that are strong indicators of whether a search result previously presented for a multi-site-entity search query is, in fact, a relevant result. Two such user behavior signals include (i) users invoking an information window for a listed entity from a search result and (ii) users submitting a direction request for the entity listed in the search result.

In general, one innovative aspect of the subject matter described in this specification can be embodied in methods that include the actions of: identifying a plurality of prior user sessions, wherein a search result referencing a business listing was provided in response to a multi-site-entity search query in each of the plurality of prior user sessions, and wherein the multi-site-entity search query includes a search keyword that is a shared name of multiple entities that are located at multiple respective geographic locations; determining, from log data associated with the plurality of prior user sessions, an information window invocation frequency associated with the business listing; determining, from the log data associated with the plurality of prior user sessions, a direction request frequency associated with the business listing; determining that terms contained in a business name field of the business listing match terms in the search keyword of the multi entity search query; and using the information window invocation frequency and the direction request frequency to determine whether to modify at least one of an entry in a blacklist of business listings associated with the multi-site-entity search query or an entry in a multi-site-entity index associated with the multi-site-entity search query.

Other embodiments of this aspect include corresponding computer systems, apparatus, and computer programs recorded on one or more computer storage devices, each configured to perform the actions of the methods. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These and other embodiments can each optionally include one or more of the following features.

In some implementations, using the information window invocation frequency and the direction request frequency to determine whether to modify an entry in a blacklist of business listings associated with the multi-site-entity search query further includes: adding the business listing to the entry in the blacklist of business listings when at least one of the information window invocation frequency is below a first threshold and the direction request frequency is below a second threshold.

In some implementations, using the information window invocation frequency and the direction request frequency to determine whether to modify an entry in a multi-site-entity index associated with the multi-site-entity search query further includes: adding the business listing to the entry in the multi-site-entity index when the information window invocation frequency is greater than a first threshold and the direction request frequency is greater than a second threshold.

In some implementations, the methods further include the actions of: using the information window invocation frequency and the direction request frequency determined for the business listing to calculate a score for the business listing; and storing the score with the business listing in the entry in the multi-site-entity index.

In some implementations, using the information window invocation frequency and the direction request frequency to determine whether to modify an entry in a multi-site-entity index associated with the multi-site-entity search query further includes: removing the business listing from the entry in the multi-site-entity index when at least one of the information window invocation frequency is below a first threshold or the direction request frequency is below a second threshold.

In some implementations, the information window invocation frequency is specified in terms of a count representing a number of times that users invoked an information window referring to the business listing during the plurality of prior user sessions.

In some implementations, the information window invocation frequency is specified in terms of a ratio between a count representing a number of times that users invoked an information window referring to the business listing during the plurality of prior user sessions and a base count.

In some implementations, the base count is a count of the plurality of prior user sessions.

In some implementations, the direction request frequency associated with the business listing is specified in terms of a count of a number of direction requests that have occurred during the plurality of prior user sessions in which at least one of a start point, destination point, or way point of the direction requests matches the address associated with the business listing.

In some implementations, the direction request frequency is determined as a ratio between a count of a number of direction requests that have occurred during the plurality of prior user sessions in which at least one of a start point, destination point, or way point of the direction requests matches the address associated with the business listing and a base count.

Particular embodiments of the subject matter described in this specification can be implemented so as to realize one or more of the following advantages.

Recognizing true members of a multi-site entity and presenting them in response to a multi-site-entity search query can improve search quality for users.

In addition, a comprehensive multi-site-entity index can be built and improved over time, further improving the efficiency and quality of future multi-site-entity searches.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A search system, e.g., an Internet search engine, can offer location-related search services to users. When a user of the search system submits a search keyword specifying a name or a functional category of an entity, e.g., a business, the search system can identify entities (e.g., particular businesses and business locations) that match the terms in the search keyword, and provide search results that refer to the business listings of the entities in a search result interface (e.g., a search result webpage). A functional category can be, for example, "post office" "court house" "DMV" and so on. The term "entity" in a broad sense refers to any named entity (e.g., a commercial establishment, public or private agency, public or private facility, or government unit) that has a physical place of business and conducts particular types of business or provides particular types of goods or services. Some search systems also allow the user to enter a location limitation specifying a target location, and focus the search near the target location.

When multiple relevant entities have been identified for a search query, the search system typically ranks the relevant entities according to various factors, e.g., how well the names or functional categories of the entities match the terms specified in the search keyword, various known properties of the entities (e.g., business type, location, size, or user ratings), and/or user behaviors with respect to previously presented search results that referred to the entities. In some implementations, where the search system allows the user to enter a target location, the distance between a physical address associated with each relevant entity and the target location may be used as a factor in ranking the entity.

The search system then provides the search results to the user's device. Search results can be provided in a textual form, e.g., as a list of business names and optionally images or short summaries for the resulting entities, or in graphical form as visual markers indicating respective geographic locations of the resulting entities on a map, or both. The user can select a search result presented in the search result interface to view a business listing or other information about the entity referred to by the search result.

A user of a location search service sometimes may wish to find entities that, for the user's particular purpose, are functional equivalents located at different geographic locations. A group of entities can be a group of related, functionally equivalent, entities that share a name the public uses to identify any member of the group of related entities. The user can use the shared name of the entities as a search keyword in a search query to obtain search results that point to the business listings of the entities in the group. The user can then choose to view more information about particular ones of the entities based on their geographic locations.

For example, consider a fast food chain that has multiple member stores distributed at different geographic locations. All stores of the chain share a name that the public uses to identify the stores, and all stores of the chain usually offer the same, equivalent, or roughly equivalent goods and/or services to their customers. If a user wishes to look for stores of the chain and is willing to visit any one of the stores provided that it is conveniently located, the user can submit a search query containing a search keyword that is the name that the public uses to identify the chain. When the search system returns search results identifying the stores of the chain, the user can review respective geographic locations of the stores to determine which stores are conveniently located. Sometimes, the user can also review other information (e.g., store hours or special amenities) to determine which stores may actually be able to serve the user's needs.

Sometimes, a group of entities that share a common name is a group of entities related by common ownership (e.g., stores of a business chain), a group of entities related by organizational agreements (e.g., stores of a business franchise), or a group of entities related by function or usage (e.g., offices of a public or private agency or governmental unit). Examples of the public or private agencies or governmental units include post offices, court houses, departments of motor vehicles, federal and state unemployment offices, or immigration processing centers.

Each member entity of a group of such entities has a distinct geographic location. All aspects of the goods and/or services provided by the member entities of the group do not have to be identical in order for the entities to qualify as functionally equivalent, as long as the general public does not generally differentiate among the member entities based on characteristics other than their respective geographic locations.

When a user submits a search query that contains a search keyword that specifies a name (e.g., a trade name) that the public uses to identify a group (or a member of a group) of related, functionally equivalent entities, the search system can identify business listings of entities whose names match the terms in the search keyword. (These listings are referred to herein as "business listings" even though, in some cases, the entities are not businesses.) However, some of the business listings so identified may not refer to entities that are members of the functionally equivalent group. For example, a business listing could be a spam listing that fails to identify an entity that is related to the group in terms of services or products provided.

To improve the quality of search results that are provided to a user, a search system can first determine whether a search query entered by the user contains a search keyword that is the name of a multi-site entity. The search query may include other search limitations that are not part of the search keyword, e.g., a geographic limitation, and the search system can process the search query to identify the name of the multi-site entity among any other search limitations in the search query.

In some implementations, the search system stores a collection of previously submitted multi-site-entity search queries, each of which corresponds to a shared name of a multi-site entity (i.e., a group of related, commonly named, functionally equivalent, and separately located entities). Example methods for compiling such a collection will be described later in this specification. Each stored multi-site-entity search query includes a search keyword, and the search keyword includes the sequence of terms that represents the shared name of the multi-site entity. If the search system determines that the received search query contains a search keyword that matches the search keyword of one of the stored multi-site-entity search queries, the search system can filter out business listings that are not members of the group of related, functionally equivalent entities, even if the listings have otherwise (e.g., by name matching) been determined to be relevant to the received search query.

In particular, two user behavior signals related to a business listing are used to determine whether the business listing corresponds to a member of a multi-site entity group. The two user behavior signals are based on user interactions with respect to search results that referred to the business listing that were previously presented to one or more users in response to one or more previously submitted multi-site-entity search queries. One user behavior signal is whether a user invoked an information window for the business listing from a search result presented in response to the multi-site-entity search query. The other user behavior signal is whether the user requested driving directions to an address associated with the business listing during a user session in which a search result referring to the business listing was presented in response to the multi-site-entity search query.

In some implementations, user interaction data (including user interaction data related to the two types of user behaviors discussed above) can be collected through a search result interface presented in multiple user sessions over an extended period of time. The collected user interaction data may be anonymized in one or more ways before it is stored, so that personally identifiable information from the user sessions is removed. For example, a user's identity may be anonymized so that no personally identifiable information can be determined for the user. User preferences or user interactions can likewise be anonymized, (for example, by averaging them over geographic regions, or over the nature of the queries submitted, etc.). Finally, the user interaction data stored by the search system may be deleted after a predetermined period of time.

The user interaction data can be used to score a given entity listed in a search result that was presented in response to a previously submitted multi-site-entity search query. The score can be based on the two types of user behaviors identified above (i.e., whether the user invoked an information window for the search result or whether the user requested driving directions to the location of the search result), and can be stored with the user interaction data or with the business listing for which the score was determined. Search results or business listings identified in a subsequently submitted multi-site-entity search query can be removed, demoted, or promoted based at least in part on these scores.

Figure 1:
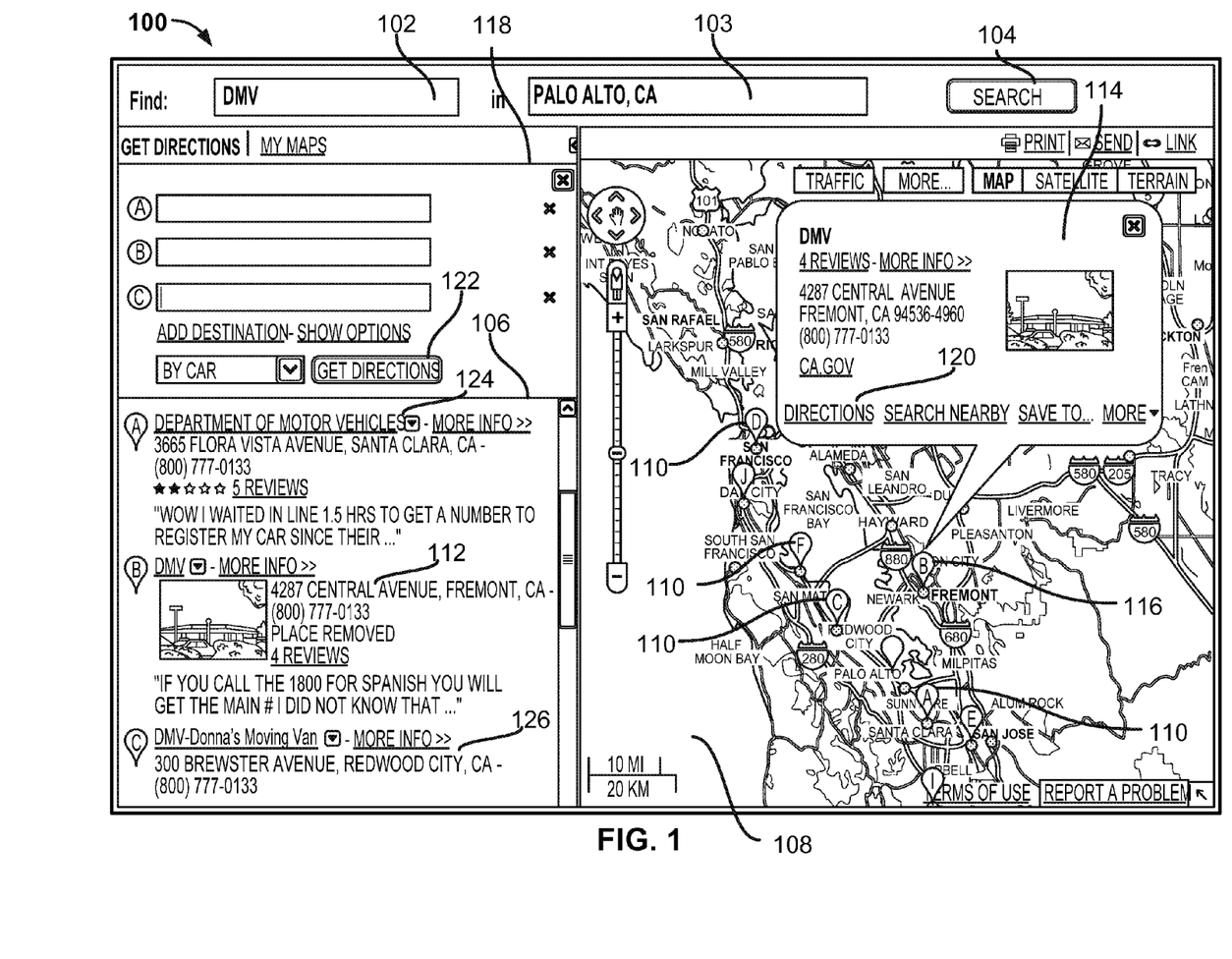
FIG. 1 illustrates an example location search interface provided by an example search system.

FIG. 1 illustrates an example location search interface 100 provided by a search system. In some implementations, the location search interface 100 is implemented as one or more webpages and rendered in a web browser application executing on a user device (e.g., a user's computer or smart phone). In some implementations, the location search interface 100 presents visual markers on a map to indicate the physical locations of business listings that are responsive to a search query. The user may interact with the user interface elements presented on the location search interface 100 to submit search queries and/or to review search results. Data representing the user interactions are transmitted to the search system. Since the location search interface 100 also serves to present search results, the location search interface 100 is also a search result interface.

In this example, the location search interface 100 includes an input field 102 for receiving a search keyword naming an entity or an entity category from a user. For example, a user can enter one or more terms in the input field 102 to specify a complete or partial business name of an entity of interest (e.g., "DMV" or "Department of Motor Vehicles"). In some implementations, the location search interface 100 also includes an input field 103 for receiving a location limitation associated with the search keyword from the user. The location limitation can be specified in terms of the name of a geographic area (e.g., Palo Alto, Calif.) or a postal code, for example. In situations where the user does not explicitly specify a geographic area, a location limitation can be inferred from a location associated with the user, e.g., a location derived from the user's IP address, wifi connection, GPS location, an address that the user has registered with the search system, or a geographic area currently represented in a map shown to the user in the location search interface 100.

In some implementations, a single input field may be used to receive input from the user, and the search terms entered by the user in the single input field may include both terms for the search keyword and terms for the location limitation, e.g., "DMV in Palo Alto." Various methods (e.g., identifying common delimiters, matching search terms with known entity names, or matching search terms with known location names) can be used to parse the terms specified in the single input field in order to separate the search keyword from other search limitations.

After the user has entered the search keyword (e.g., "DMV") in the input field 102 and submitted the search query to the search system (e.g., by clicking on the "Search" button 104), the search system identifies relevant business listings based on the terms in the search query, and returns search results that refer to the relevant business listings to the user device. The returned search results can be presented in a search result area 106 in the location search interface 100.

As shown in the search result area 106, each returned search result can include an entity name and a physical address for the entity. In some implementations, additional information (e.g., an image, logo, review, or associated contact information) can be presented in the search result area 106 as well. In some implementations, the search system generates the search results based on information available in the business listings of entities that are responsive to the search query.

In some implementations, the location search interface 100 includes a map area 108. The map area 108 displays a map for a geographic area associated with the search, and the search can be limited to entities having addresses within the geographical area displayed on the map. One or more visual markers 110 can be presented on the map to indicate the physical locations of one or more top-ranked search results or entities (e.g., top 10 search results).

In some implementations, the location search interface 100 allows the user to select each search result individually (e.g., by clicking on an embedded hyperlink in the search result text or a visual marker 110 on the map), in order to view additional information available about the entity represented by the selected search result.

For example, when the user selects a search result (e.g., search result 112), an information window 114 is presented in the location-search interface 100. The information window 114 can be placed over the map in proximity to a visual marker associated with the selected search result 112, and can display the name, address, and other available information about the entity referred to by the selected search result.

In some implementations, presentation of the information window 114 can be invoked by using a pointing device to hover over or select the visual marker (e.g., the visual marker 116) associated with the search result 112 on the map.

When the user selects a search result (e.g., include invoking an information window related to a result or entity) by interacting with the search result, data related to the user's interaction can be recorded and transmitted to the search system. The user interaction data may be anonymized and otherwise managed, as described above, to protect user privacy.

In some implementations, the information window 114 also includes various user interface elements for requesting directions to an address associated with the entity, for searching for other businesses near the address, for saving the search result for later review, and so on. In some implementations, the location search interface 100 can also include a direction request window 118 and the user can request directions to an address associated with a search result by either selecting the direction search user interface element 120 within the information window 114, or by entering the address directly in the direction request window 118.

The direction request window 118 includes input fields for a starting address and a destination address. The user may optionally insert one or more intermediate destinations or waypoints between the start and the destination addresses. Once the user enters the addresses and submits the direction request (e.g., by clicking on the "Get Directions" button 122), the location search interface 100 presents a suggested route between the start and destination addresses that passes through all of the intermediate destinations or waypoints, if any. Optionally, the suggested route is presented in a separate window or user interface from the search result area 106, and/or overlaid on the map in the map area 108. In some implementations, the direction request window 118 is located in another interface separate from the location-search interface 100.

When the user submits a direction search request for an address associated with a search result, data related to the direction search request is transmitted to the search system. The search system can use the data to note a relationship between the direction request and the search result or entity for which the direction request has been submitted.

For example, when the direction request is made from a user interface element 120 in the information window 114, the direction request data can include information that identifies the entity referred to in the information window 114. When the direction request is made from a user interface element (not shown) placed next to a search result, the direction request data can include information identifying the search result, and hence the entity referred to by the search result. When the direction request is made from the direction request window 118, the direction request data can include information identifying all search results currently shown on the location search interface 100. The search system can check to see if any of the start address, destination address, or way point(s) of the direction request matches the address associated with any of the entities provided in the search result. If there is a match between an address specified in a direction request and an address associated with a search result entity, the direction request is deemed by the search system to have been submitted for that search result entity.

In some cases, a user may review a search result, but fail to submit a direction request related to the search result until after the user has performed other actions (e.g., submitted other searches on the location search interface, browsed other search results, or visited other user interfaces or webpages) on the user device. Thus, the subsequently submitted direction request may contain no information that directly relates back to a particular prior search or search result. In some implementations, the search system is able to relate the direction request to one or more search results based on the fact that the direction request is submitted during the same user session in which the one or more search results were presented in response to a search query, and includes a start address, destination address or way point that matches an address associated with an entity provided in the search result.

The search system may group user activity into a user session in a number of ways including, for example, by a predetermined period of time (for example, thirty minutes), by a predetermined number of queries (for example, three queries), by a period of activity that ends with a predetermined period of inactivity (for example, ten minutes without submitting a query), while a user is logged-in to a system, or while a user submits queries that relate to similar topics (e.g., refer to entities in the same industry). Data on user interactions with the search system (e.g., queries submitted, direction requests submitted, search results received, invocation of information windows from the search result interfaces, etc.) during a user session can be stored in association with a session identifier based on a particular definition of a user session. Personally-identifiable information can be removed before the user session data are stored and processed.

In this example shown in FIG. 1, the search results provided by the search system include members of a multi-site entity group e.g., offices of the Department of Motor Vehicles, but also include an entity 126 (i.e., "Donna's Moving Van") that is not a member of the multi-site entity group. The search results that do not refer to true members of the multi-site entity group have been included because they nevertheless satisfied various relevance and quality measures used by the search system to respond to the search query. The collective interaction of many users with respect to a particular search result presented in response to the same or similar search queries can indicate a general interest or disinterest in the search result. The search system can use information about this collective behavior to ascertain whether the search result corresponds to a true member of a group of commonly named, functionally equivalent, entities associated with the multi-site-entity search query.

The location search interface 100 is merely illustrative of the layout and elements of a location search interface and associated search result interface. Other layouts of the location search interface and search result interface are possible. For example, the different components of the location search interface 100 can be presented on separate webpages, and user interface elements for additional functions can be provided. In addition, the location search interface needs not be implemented as one or more webpages. Other application interfaces for submitting search queries and presenting search results can be implemented.

Figure 2:
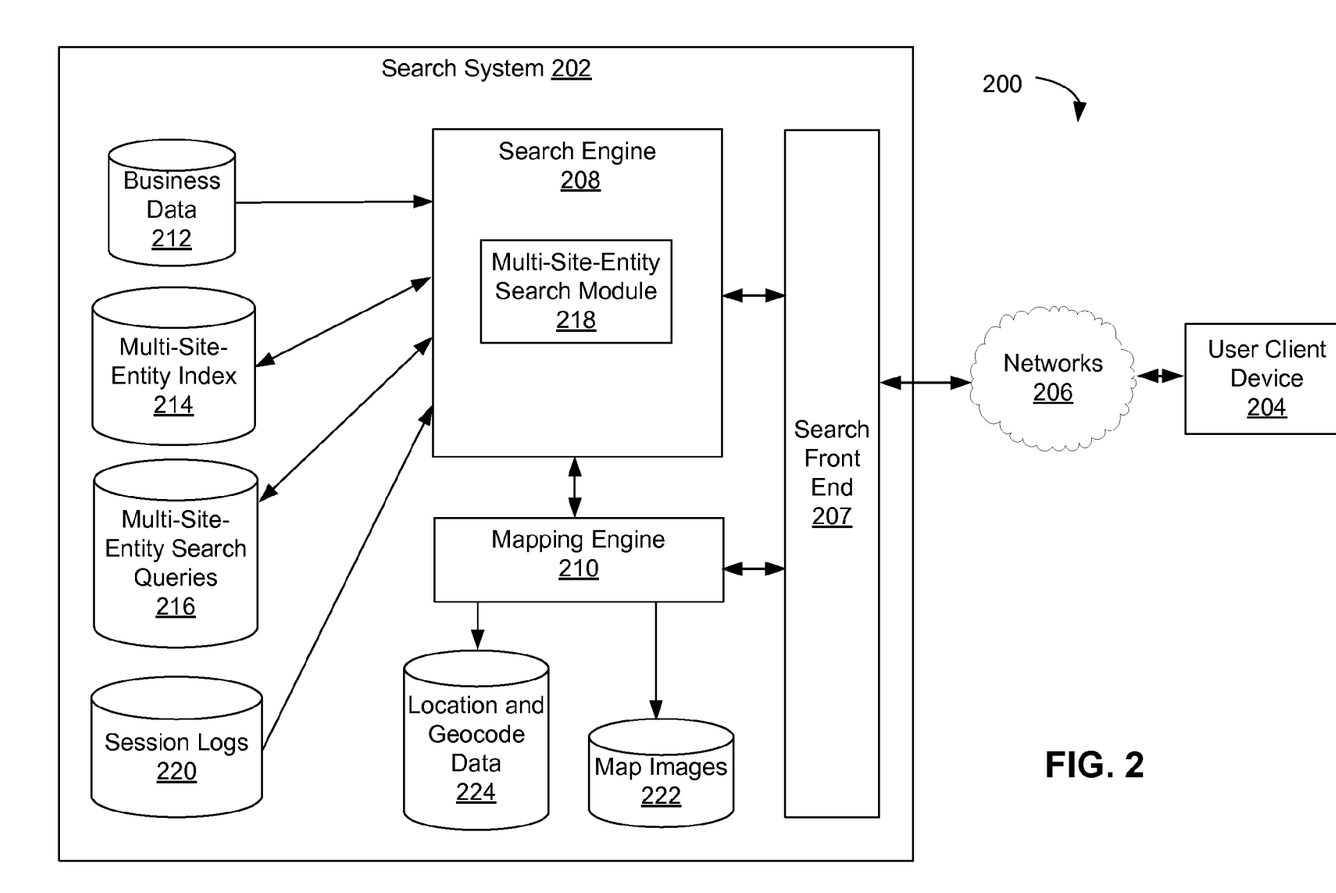
FIG. 2 is a block diagram illustrating the example search system of FIG. 1.

FIG. 2 illustrates an example network environment 200 in which an example search system 202 operates. The network environment 200 includes a user device 204 communicating with the search system 202 through one or more networks 206. The one or more networks 206 can include local area networks, wide area networks, wireless networks, or the Internet. The user device 204 can be a desktop computer, notebook computer, tablet computer, personal digital assistant, mobile phone, smart phone, or other fixed or mobile electronic device.

Users enter search queries through a location search interface presented on a user device 204. The search system 202 receives user-submitted search queries from the user device 204, and performs searches for businesses, addresses, and places of interest in response to the search criteria (e.g., search keywords and geographic limitations) specified in the search queries.

The search system 202 identifies candidate entities that may be relevant to the search queries based on various relevance measures. The search system 202 may filter the candidate entities to reject some of the candidate entities from the final search result list based on various filtering criteria. The search system may rank the remaining candidate entities based on the various relevance measures and optionally various measures of quality. The search system 202 formulates ranked search results based on the ranked candidate entities and provides the search results to the user device 204 for presentation on an interface e.g., the user interface 100 shown in FIG. 1.

As shown in FIG. 2, the search system 202 includes a search front end 207 that receives search query data and user interaction data from the user device 204 and transmits search result data to the user device 204. The search system 202 includes a search engine 208 for identifying the entities relevant to the search queries, and a mapping engine 210 for locating and presenting the relevant entities on a map. The search engine 208 and the mapping engine 210 each have access to a number of data repositories (e.g., databases, search indices, and data logs) to carry out their respective tasks.

For example, the search engine 208 has access to a business data repository 212. The business data repository 212 includes information regarding named entities, e.g., businesses, public and private agencies, government units, public and private facilities, and places of interest. Information on each entity is stored in a business listing for the entity. The business listings in the business data repository 212 are collected through various means, including voluntary registration by business owners, commercial business data feeds (e.g., local white and yellow pages), or both. In some implementations, the business data repository 212 also includes information culled from webpages of various named entities (e.g., government agency webpages, state park webpages) on the Internet.

A business listing stored in the business data repository 212 may include, for a particular entity, the name (e.g., in a business name field of the business listing), physical address (e.g., in an address field of the business listing), phone number, fax number, email address, website URL, operating hours, special amenities, and so on. Other information associated with the entity (e.g., a picture of the physical building or storefront of the entity, or user reviews) is optionally stored in the business data repository 212 and associated with the business listing of the entity. The business data repository 212 can be implemented on any local or distributed data storage infrastructure, as a database managed by a database management system, as one or more data files, or as a searchable index, for example.

The entities that have their respective business listings stored in the business data repository 212 are generally either single-site entities or members of a group of related, commonly named, functionally equivalent entities. Examples of a single-site entity include the Statue of Liberty and the White House. Examples of multi-site entities include McDonald's restaurants, or branches of a Department of Motor Vehicles or the U.S. Postal Service.

In some implementations, the search system 200 includes a multi-site-entity index 214 that includes one or more groups of business listings, where each group of business listings includes multiple entities that are currently deemed to be members of a group of related, commonly named, and functionally equivalent entities. Each group of business listings in multi-site-entity index 214 is considered by the search engine 208 to be relevant to a respective multi-site-entity search query. In cases where a group has two or more names that the public uses to identify the group, the business listings of the group may be considered relevant to two or more multi-site-entity search queries, each of which uses one of the two or more names. For example, a group consisting of branch offices of the Dept. of Motor Vehicles may be responsive to search queries for "DMV" or for "Dept. of Motor Vehicles."

The multi-site-entity index 214 can be built using various sources of information (e.g., information provided by owners of business chains or business franchises, manual compilation of known business chains, or from information obtained by crawling one or more webpages associated with the business chains as explained below). As described in this specification, an entity associated with a group identified in the multi-site-entity index 214 may be added to or removed from the group based on user behavior signals with respect to the entity when the entity has been presented in previous search results in response to previously submitted multi-site-entity search queries.

In some implementations, the search system 202 has access to a multi-site-entity search query repository 216. The multi-site-entity search query repository 216 includes a collection of known multi-site-entity search queries. Each known multi-site-entity search query includes a search keyword that is a name that the public uses to identify members of a group of related, commonly named, functionally equivalent entities.

The collection of known multi-site-entity search queries can be compiled through various means. For example, for large, well-known groups of related entities such as grocery store chains, the name or names that the public uses to identify each group of related entities can be compiled manually. In addition, some business chains include anchor text indicating their chain business status on their business websites. A web crawler and/or search engine can identify the anchor text, use it to gather the names of business chains, and add the business chain names to the multi-site-entity index 214 and the multi-site-entity search query repository 216.

The methods described above work well for large and well-known business chains and franchises. To build a comprehensive multi-site-entity index 214 and a comprehensive list of multi-site-entity search queries 216 that target smaller and lesser known business chains and franchises, various other methods may also be employed. One method uses search queries submitted through a location search interface to identify names of business chains or franchises. For example, if a search keyword includes a particular term or combination of terms followed by a trigger term "locations,"

and the search keyword appears in a large number (e.g., more than a threshold number) of user-submitted location-related search queries, then it is likely that the particular term or combination of terms represents the shared name of a group of related functionally equivalent entities (i.e., a multi-site entity). The particular term or combination of terms can be stored as a new entry in the multi-site entity index 214 and the multi-site-entity search query repository 216, and the search results presented in response to the search query can be included as members of the newly indexed group in the multi-site-entity index 214. Thus, the collection of multi-site-entity search queries in the multi-site-entity search query repository 216 as well as the number of groups in the multi-site-entity index 214 can continue to grow as more multi-location-related search queries are collected through the location search interface.

When the search engine 208 receives a search query through a location search interface, the search engine 208 can compare the search keyword of the search query to the respective search keywords of the collection of known multi-site-entity search queries or multi-site-entities. If a match is found, the search engine 208 will recognize the received search query as a multi-site-entity search query, and performs searches and ranking that are tailored to multi-site-entity searches. For example, the search engine 208 can search for the multi-site-entity index 214 for one or more groups of entities that are responsive to the search keyword, and return the entities associated with the one or more responsive groups in response to the search query.

In some implementations, the search engine 208 can include a multi-site-entity search module 218 to rank and filter candidate entities that have been identified by the search engine 208 as responsive to the multi-site-entity search query. The ranking and filtering can be based at least in part on the two user behavioral signals identified above (i.e., invocation of an information window and a request for directions in previously presented search results). The search system can include session logs 220 that record information on queries received from users during prior user sessions and information on user interactions with respect to the search results presented in response to the queries. The data in the session logs may be anonymized to remove personally identifiable information and otherwise managed, as described above, to protect user privacy. The search engine 208 may process the data stored in the session logs 220 to derive the two user behavioral signals identified above (i.e., invoking an information window and requesting directions), in relation to particular search results presented in response to previously submitted multi-site-entity search queries.

As set forth earlier, the search system 202 can build and refine the multi-site-entity index 214 based on the two user behavior signals. For example, the two user behavioral signals can be used to determine whether to add or remove a business listing from the multi-site-entity search index 214.

In some implementations, the business listing of an entity can be used to add to a group in the multi-site entity search index 214 when the terms in the business name field of the business listing match the terms in the search keyword of a multi-site-entity search query, and when information gathered from previous user sessions related to the multi-site-entity search query indicate that both an information window invocation frequency and a direction request frequency associated with the entity are above respective predetermined threshold values. The information window invocation frequency indicates how frequently users invoked an information window for a search result referring to the entity when the search result had been presented in response to the multi-site-entity search query in prior user sessions. The direction request frequency indicates how frequently users requested directions for an address associated with the entity in the same prior user session in which a search result referring to the entity had been presented in response to the multi-site-entity search query.

In some implementations, the business listing of an entity can be removed from a group in the multi-site-entity search index 214 when the terms in the business name field of the business listing match the terms in the search keyword of a multi-site-entity search query, and when information gathered from previous user sessions related to the multi-site-entity search query indicate that both an information window invocation frequency and a direction request frequency associated with the entity are below respective predetermined threshold values.

For each of the information window invocation frequency and the direction request frequency, the predetermined threshold values used to determine when to remove an entity from a group in the multi-site-entity index 214 can be either equal to or less than the predetermined threshold values used to determine when to add an entity to a group in the multi-site-entity index 214.

In some implementations, an entity can be added to the multi-site-entity index 214 when either the information window invocation frequency or the direction request frequency is above its respective predetermined threshold value. Likewise, in some implementations, an entity can be removed from the multi-site-entity index 214 when either the information window invocation frequency or the direction request frequency is below its respective predetermined threshold value.

In some implementations, one or more of the information window invocation frequency or the direction request frequency can be specified in terms of a respective count. For example, the information window invocation frequency associated with an entity (and hence the business listing of the entity) can be a count indicating a number of times that users invoked an information window for a search result referring to the entity when the search result was presented in response to a previously submitted multi-site-entity search query. The direction request frequency associated with an entity (and hence the business listing of the entity) can be a count indicating a number of times that users requested directions for an address associated with the entity in the same prior user session in which a search result referring to the entity had been presented in response to the multi-site-entity search query. In some implementations, the respective threshold values for one or more of the information window invocation frequency or the direction request frequency can depend on a base count (i.e., can be a function of the base count) that indicates the number of prior user sessions in which a search result referring to the entity was presented in response to the multi-site-entity search query.

In some implementations, one or more of the information window invocation frequency or the direction request frequency can be specified in terms of a respective ratio. For example, the information window invocation frequency associated with an entity can be a ratio between a count of the number of times that users invoked an information window for a search result referring to the entity when the search result was presented in response to a previously submitted multi-site-entity search query and the base count.

In some implementations, in addition to or instead of modifying the multi-site-entity search index 214, the search engine 208 can use the above mentioned historical user behavior signals to identify or reject candidate entities in multi-location-related searches. For example, the search engine 208 can discard business listings of entities that are otherwise responsive to a multi-site-entity search query, thereby preventing the business listings from being provided to users in response to the multi-site-entity search query, if the business listings fail to have an historical information window invocation frequency that is above a first threshold or an historical direction request frequency that is above a second threshold, or both. In some implementations, a blacklist of business listings can be formed for the multi-site-entity search query, and stored in a blacklist repository that is associated with the multi-site-entity search query. Business listings that are otherwise responsive to a multi-site-entity search query, but that are rejected because they fail to pass either the information window invocation frequency threshold or the direction request frequency threshold, can be added to the blacklist repository. The search engine 208 can reject particular candidate entities as search results in subsequent multi-location-related searches if the candidate entities are located in the blacklist repository.

In some implementations, the search system 202 derives scores for each candidate entity that is responsive to a multi-site-entity search query based on the information invocation frequency and the direction request frequency associated with the entity. The multi-site-entity search module 218 can use the scores as a factor in ranking the candidate entities as search results.

The search system 202 also includes a mapping engine 210. The mapping engine 210 has access to a map images repository 222 and a location and geocode data repository 224. The mapping engine 210 associates addresses and location names with geocodes based on the information in the location geocode data repository 224. The geocode data in the repository 224 include geospatial coordinates (e.g., latitude and longitude) of locations stored in one or more standardized formats (e.g., the Geospatial Entity Object Codes format). The mapping engine 210 also identifies map images in the map images repository 222 that correspond to particular locations or geocodes and nearby areas. Further, the mapping engine 210 can overlay other information on the map images for presentation to a user (e.g., location markers or a route and waypoints on the route that are associated with driving directions).

In some implementations, when the search engine 208 identifies relevant entities in the business data repository 212, the search engine 208 transmits the addresses of the relevant entities to the mapping engine 210. The mapping engine 210 matches the addresses to geocodes and identifies map images corresponding to the geocodes.

The search system 202 then generates a search result page that includes an embedded map and the search results representing some or all of the relevant entities, in either textual form or as visual markers on the map, or both. In some implementations, the search results are ranked, and the visual markers are only provided for the top-ranked results.

In some implementations, the mapping engine 210 also accepts a start address and a destination address, and optionally one or more waypoints, as inputs, determines a route between the start address and the destination address through all waypoints, if any, and displays the route on the appropriate map images.

Figure 3:
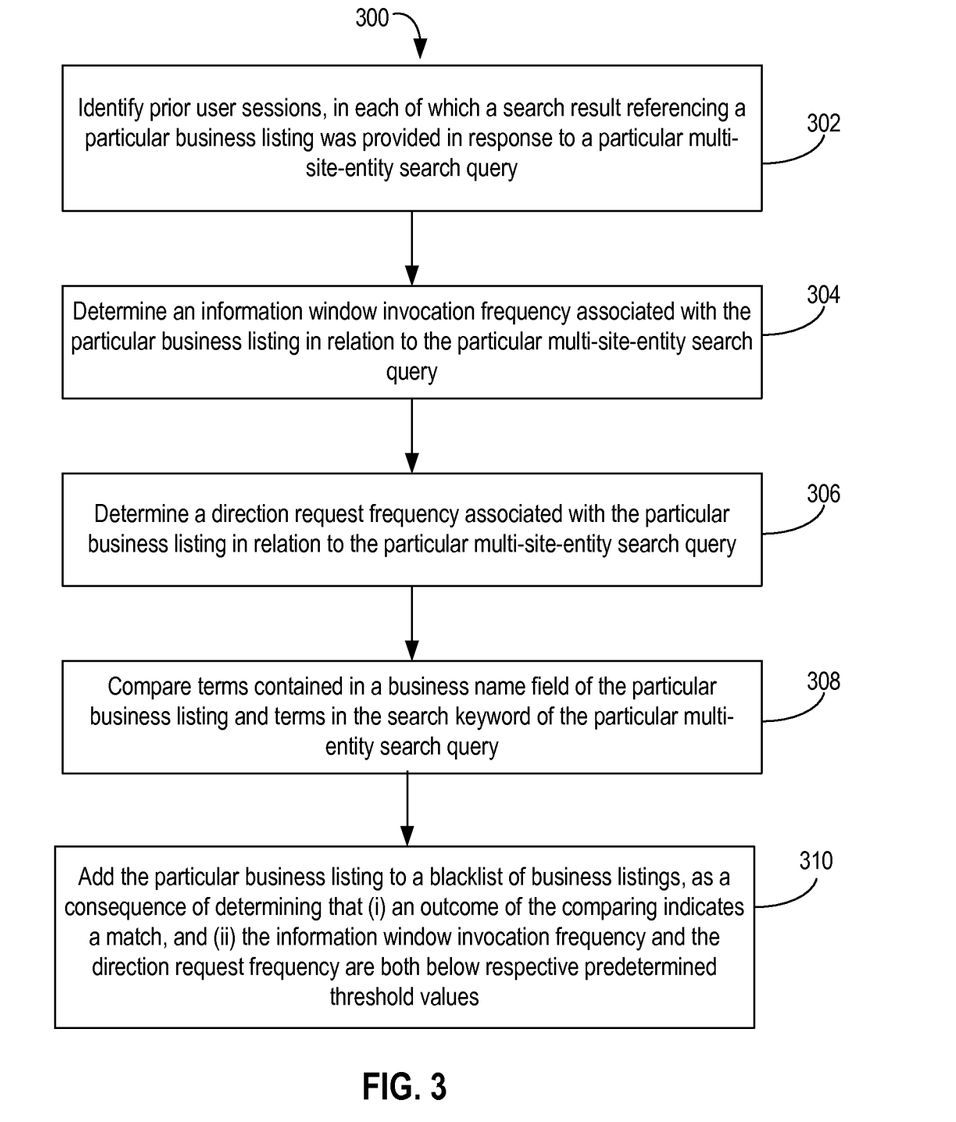
FIG. 3 is a flow diagram of an example process for adding a business listing to a blacklist of business listings for a multi-site-entity search query.

FIG. 3 is a flow diagram of an example process 300 for adding a business listing to a blacklist of business listings for a multi-site-entity search query. The example process 300 can be performed by a search system that offers location-related search services, e.g., the search system 202 (FIG. 2).

In the process 300, a plurality of prior user sessions are identified (302), in each of which a search result referencing a particular business listing was provided in response to a particular user-submitted multi-site-entity search. The particular multi-site-entity search query is identified as being a multi-site-entity search query because it is present in a repository of known multi-site-entity search queries.

Then, from log data associated with the plurality of prior user sessions, an information window invocation frequency associated with the particular business listing in relation to the particular multi-site-entity search query is determined (304). In addition, from log data associated with the plurality of prior user sessions, a direction request frequency associated with the particular business listing in relation to the particular multi-site-entity search query is determined (306). The log data may be anonymized and otherwise managed, as described above, to protect user privacy.

The terms in a business name field of the particular business listing and the terms in the search keyword of the particular multi-entity search query are compared (308). The particular business listing is added to a blacklist of business listings when the terms in the business name field of the particular business listing match the terms in the search keyword of the particular multi-site-entity search query, and the information window invocation frequency and the direction request frequency are both below respective threshold values (310). The blacklist of business listing can be used for filtering out search results for the particular multi-site-entity search query in subsequent location-related searches. The disclosed algorithm reflects the fact that, while the terms in the business name field of the business listing may match the terms in the search keyword of the multi-site-entity search query (which typically indicates that the business listing is a relevant search result for the search query), if users seldom invoke an information window associated with the search result referring to the business listing and seldom request directions to the address associated with the business listing, the business listing is likely to not actually represent a relevant search result for the multi-site-entity search.

A blacklist of business listings for a multi-site-entity search query can be generated by performing the process 300 for each of multiple business listings that have been referred to by a search result provided in response to the multi-site-entity search query. Multiple blacklists of business listings can be generated, where each blacklist is specific to a particular multi-site-entity search query. The blacklisted business listings can be excluded from a multi-site-entity index 214 used for identifying search results for the multi-site-entity search queries.

A respective score can be calculated for business listings that do not qualify for inclusion in the blacklist, based on the respective information window invocation frequency and the direction request frequency derived for the business listing. The scores can be stored with the business listings in the multi-site-entity index 214, and provided to the search system for ranking search results for the particular multi-site-entity search query in subsequent location-related searches.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   determining that a query is a multi-site-entity search query by, at least in part, determining that the query contains a search keyword that is a shared name of multiple entities that are located at multiple respective geographic locations, wherein determining that the query is a multi-site-entity search query comprises:
      comparing terms in the query to names of businesses in a collection of business listings;
      determining, based on the comparison, that some terms in the query match names of businesses that are associated with multiple entities in the business listing and, in response, designating at least part of the some terms in the query as the search keyword that is a shared name of multiple entities that are located at multiple respective geographic locations; and
      determining that some other terms in the query are not associated with multiple entities in the business listing;
   identifying a plurality of prior user sessions comprising receiving the multi-site-entity search query and providing a search result referencing a business listing in response to receiving the multi-site-entity search query;
   determining, from log data associated with the plurality of prior user sessions, an information window invocation frequency associated with the business listing, wherein the information window comprises information about the business listing overlaid on a map;
   determining, from the log data associated with the plurality of prior user sessions, a direction request frequency associated with the business listing;
   determining that terms contained in a business name field of the business listing match terms in the search keyword of the multi-entity search query; and
   determining whether to modify at least one of an entry in a blacklist of business listings associated with the multi-site-entity search query or an entry in a multi-site-entity index associated with the multi-site-entity search query based at least in part on the information window invocation frequency and the direction request frequency, wherein the blacklist of business listings associated with the multi-site-entity search query identifies entities for which search results corresponding to the identified entities are to be excluded from search results provided in response to the multi-site-entity search query such that search results corresponding to the entities identified in the blacklist are not provided in response to receiving the multi-site-entity search; and
   storing the modified version of the blacklist of business listings or the modified version of the multi-site-entity index in association with the multi-site-entity search query.

2. The method of claim 1, wherein determining whether to modify an entry in a blacklist of business listings associated with the multi-site-entity search query based at least in part on the information window invocation frequency and the direction request frequency further comprises:
   adding the business listing to the entry in the blacklist of business listings when at least one of the information window invocation frequency is below a first threshold and the direction request frequency is below a second threshold.

3. The method of claim 1, wherein determining whether to modify an entry in a multi-site-entity index associated with the multi-site-entity search query based at least in part on the information window invocation frequency and the direction request frequency further comprises:
   adding an entry in the multi-site-entity index associated with the multi-site-entity search query when the information window invocation frequency is greater than a first threshold and the direction request frequency is greater than a second threshold.

4. The method of claim 1, further comprising:
   using the information window invocation frequency and the direction request frequency determined for the business listing to calculate a score for the business listing; and
   storing the score with the business listing in the entry in the multi-site-entity index.

5. The method of claim 1 wherein using the information window invocation frequency and the direction request frequency to determine whether to modify an entry in a multi-site-entity index associated with the multi-site-entity search query further comprises:
   removing the business listing from the entry in the multi-site-entity index when at least one of the information window invocation frequency is below a first threshold or the direction request frequency is below a second threshold.

6. The method of claim 1, wherein the information window invocation frequency is specified in terms of a count representing a number of times that users invoked an information window referring to the business listing during the plurality of prior user sessions.

7. The method of claim 1, wherein the information window invocation frequency is specified in terms of a ratio between a count representing a number of times that users invoked an information window referring to the business listing during the plurality of prior user sessions and a base count.

8. The method of claim 7, wherein the base count is a count of the plurality of prior user sessions.

9. The method of claim 1, wherein the direction request frequency associated with the business listing is specified in terms of a count of a number of direction requests that have occurred during the plurality of prior user sessions in which at least one of a start point, destination point, or way point of the direction requests matches the address associated with the business listing.

10. The method of claim 1, wherein the direction request frequency is determined as a ratio between a count of a number of direction requests that have occurred during the plurality of prior user sessions in which at least one of a start point, destination point, or way point of the direction requests matches the address associated with the business listing and a base count.

11. The method of claim 1, wherein information window invocation comprises detecting that a pointer in a graphical user interface of the map is hovering over a visual marker associated with the business listing in the map and, in response to the detection, causing the information about the business listing to be overlaid on the map.

12. A system, comprising:
one or more computers; and
one or more storage devices storing instructions that are operable, when executed by the one or more computers, to cause the one or more computers to perform operations comprising:
determining that a received query is a multi-site-entity search query by, at least in part, determining that the query contains a search keyword that is a shared name of multiple entities that are located at multiple respective geographic locations, wherein determining that the query is a multi-site-entity search query comprises:
comparing terms in the query to names of businesses in a collection of business listings;
determining, based on the comparison, that some terms in the query match names of businesses that are associated with multiple entities in the business listing and, in response, designating at least part of the some terms in the query as the search keyword that is a shared name of multiple entities that are located at multiple respective geographic locations; and
determining that some other terms in the query are not associated with multiple entities in the business listing;
identifying a plurality of prior user sessions comprising receiving the multi-site-entity search query and providing a search result referencing a business listing in response to receiving the multi-site-entity search query;
determining, from log data associated with the plurality of prior user sessions, an information window invocation frequency associated with the business listing, wherein the information window comprises information about the business listing overlaid on a map;
determining, from the log data associated with the plurality of prior user sessions, a direction request frequency associated with the business listing;
determining that terms contained in a business name field of the business listing match terms in the search keyword of the multi-entity search query; and
determining whether to modify at least one of an entry in a blacklist of business listings associated with the multi-site-entity search query or an entry in a multi-site-entity index associated with the multi-site-entity search query based at least in part on the information window invocation frequency and the direction request frequency, wherein the blacklist of business listings associated with the multi-site-entity search query identifies entities for which search results corresponding to the identified entities are to be excluded from search results provided in response to the multi-site-entity search query such that search results corresponding to the entities identified in the blacklist are not provided in response to receiving the multi-site-entity search; and
storing the modified version of the blacklist of business listings or the modified version of the multi-site-entity index in association with the multi-site-entity search query.

13. The system of claim 12, determining whether to modify an entry in a blacklist of business listings associated with the multi-site-entity search query based at least in part on the information window invocation frequency and the direction request frequency further comprises:
adding the business listing to the entry in the blacklist of business listings when at least one of the information window invocation frequency is below a first threshold and the direction request frequency is below a second threshold.

14. The system of claim 12, wherein using the information window invocation frequency and the direction request frequency to determine whether to modify an entry in a multi-site-entity index associated with the multi-site-entity search query based at least in part on the information window invocation frequency and the direction request frequency further comprises:
adding an entry in the multi-site-entity index associated with the multi-site-entity search query when the information window invocation frequency is greater than a first threshold and the direction request frequency is greater than a second threshold.

15. The system of claim 12, wherein the operations further comprise:
using the information window invocation frequency and the direction request frequency determined for the first business listing to calculate a score for the first business listing; and
storing the score with the first business listing in the entry in the multi-site-entity index.

16. The system of claim 12 wherein using the information window invocation frequency and the direction request frequency to determine whether to modify an entry in a multi-site-entity index associated with the multi-site-entity search query further comprises:
removing the business listing from the entry in the multi-site-entity index when at least one of the information window invocation frequency is below a first threshold or the direction request frequency is below a second threshold.

17. The system of claim 12, wherein the information window invocation frequency is specified in terms of a count representing a number of times that users invoked an information window referring to the first business listing during the first plurality of prior user sessions.

18. The system of claim 12, wherein the information window invocation frequency is specified in terms of a ratio between a count representing a number of times that users invoked an information window referring to the first business listing during the first plurality of prior user sessions and a base count.

19. The system of claim 18, wherein the base count is a count of the first plurality of prior user sessions.

20. The system of claim 12, wherein the direction request frequency associated with the first business listing is specified in terms of a count of a number of direction requests that have occurred during the first plurality of prior user sessions in which at least one of a start point, destination point, or way point of the direction requests matches the address associated with the first business listing.

21. The system of claim 12, wherein the direction request frequency is determined as a ratio between a count of a number of direction requests that have occurred during the first plurality of prior user sessions in which at least one of a start point, destination point, or way point of the direction requests matches the address associated with the first business listing and a base count.

22. The system of claim 12, wherein information window invocation comprises detecting that a pointer in a graphical user interface of the map is hovering over a visual marker associated with the business listing in the map and, in response to the detection, causing the information about the business listing to be overlaid on the map.

\* \* \* \* \*